United States Patent [19]

Guillermier

[11] 3,998,113
[45] Dec. 21, 1976

[54] METHOD FOR MACHINING WITH A LATHE AND MORE PARTICULARLY FOR COPYING AND A TOOL-CARRIER MAKING IT POSSIBLE TO IMPLEMENT SUCH A METHOD

[76] Inventor: Bernard Guillermier, Route de Vignieres, Annecy le Vieux, France

[22] Filed: Aug. 28, 1974

[21] Appl. No.: 501,407

[30] Foreign Application Priority Data

Sept. 4, 1973 France .................. 73.31853

[52] U.S. Cl. .................. 82/1 C; 82/36 R; 82/DIG. 9
[51] Int. Cl.² .................. B23B 29/00; B23B 3/00
[58] Field of Search .................. 82/36 R, DIG. 9, 1 C
[56] References Cited
UNITED STATES PATENTS

| | | | |
|---|---|---|---|
| 1,292,494 | 1/1919 | Lorenz .................. | 82/DIG. 9 |
| 3,056,320 | 10/1962 | Findley .................. | 82/36 R |
| 3,477,320 | 11/1969 | Findley .................. | 82/36 R |

Primary Examiner—Leonidas Vlachos
Attorney, Agent, or Firm—Sughrue, Rothwell, Mion, Zinn & Macpeak

[57] ABSTRACT

Method for machining with a lathe and more particularly for copying and a tool-carrier making it possible to implement such a method. The tool-carrier may be installed on the trolley of a lathe comprising a tool support sliding between two guides and rotating about an axis orthogonal to the guides. Periodically the support is moved away from a stop fixed to the guides and returned back against the stop. The point of the tool thus describes, in both directions, a small arc of a circle centered on the axle.

10 Claims, 8 Drawing Figures

FIG. 2
FIG. 3
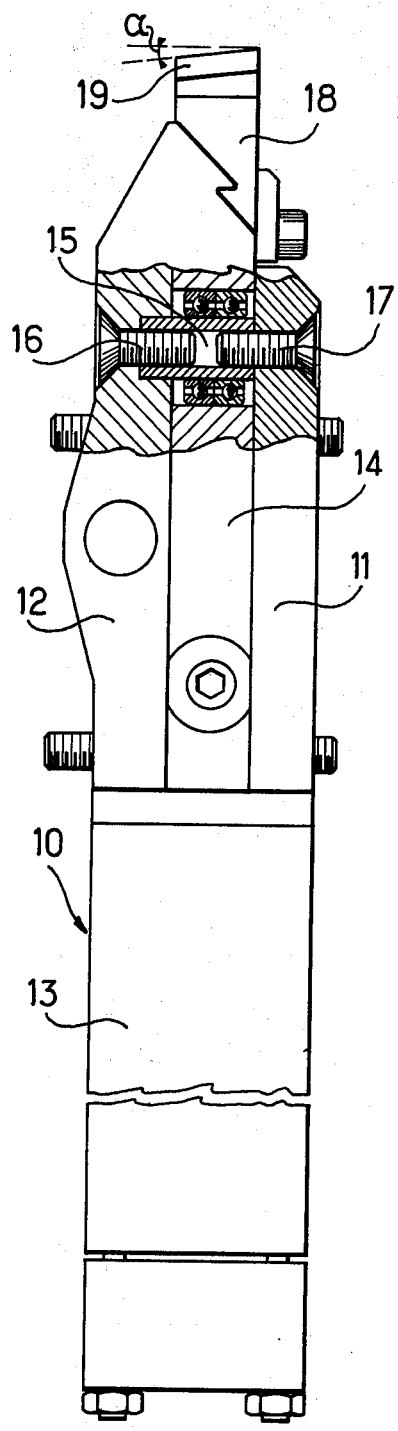
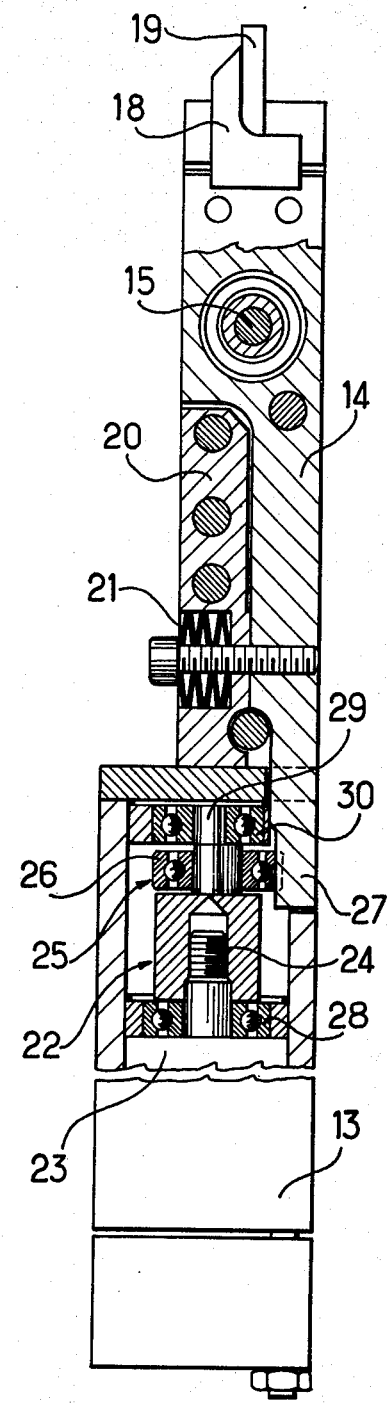

METHOD FOR MACHINING WITH A LATHE AND MORE PARTICULARLY FOR COPYING AND A TOOL-CARRIER MAKING IT POSSIBLE TO IMPLEMENT SUCH A METHOD

BACKGROUND OF THE INVENTION

1. FIELD OF THE INVENTION

The present invention relates to a method for machining with a lathe and more particularly for copying, enabling the breaking up of the turnings, as well as to the tool carrier enabling the implementing of such a method.

2. DESCRIPTON OF THE PRIOR ART

It is known that there are methods for machining with a lathe and more particularly for copying according to which the work-piece is driven in a rotating movement about an axis whereas the point of the tool is driven, in relation to the said axis, in two movements in a working plane passing through the said axis, the first movement being a driving movement in two directions one of which is parallel to the said axis, the second movement being a relative cyclic movement having a period of T and a slight amplitude in relation to the dimensions of the work-piece.

The tool driving movement in a working plane, also called tool advance, is obtained by the continuous movement of a trolley and a saddle. In certain machines, the saddle is dispensed with and the work-piece itself is driven in a linear movement along its axis of rotation.

The relative cyclic movement is generally a reciprocating rectilinear movement in a fixed direction. During the phase in which the reciprocating movement is added to the continuous movement of the trolley, the tool penetrates more rapidly into the material, then during the phase when the reciprocating movement does not accompany the continuous movement of the trolley, the advance of the tool becomes zero and even negative; the tool no longer removes any material and the turning formed during the preceding phase falls off.

The reciprocating movement of the tool therefore makes it possible to break up the turnings into small elements. The trolley is arranged in such a way that its movement moves the tool nearer to or further from the axis of rotation. The combination of the linear movement of the saddle (or of the work-piece) parallel to the axis of rotation with the movement of the trolley enables the point of the tool to follow the profile of the work-piece, but the reciprocating movement keeps a fixed direction. The result of this is that any movement of the tool parallel to the direction of vibration leads to an acceptable surface state, but on the other hand, any movement of the tool in a different direction from the direction of vibration leads to a sequence of indentations at the surface of the work-piece; the surface state is then very coarse.

The method according to the invention makes it possible to overcome these disadvantages is characterized in that the said cyclic movement comprises the following three phases: A first phase I during which the point of the tool moves away from the work-piece starting from a point of origin O and reaching a maximum travel point M following a plane curve C whose tangent at the point of origin O is substantially parallel to the said axis; a second phase I' during which the point of the tool comes back from the point of maximum travel towards the point of origin O following the curve C, a third phase J during which the point of the tool remains at the point of origin O.

A rest phase at the point of origin O during which the point of the tool is not in vibration is provided for, this leading to an excellent surface state, for each vibration causes a slight irregularity; that is why the frequency and the duration of these vibrations should be limited as much as possible.

If a small removing movement (of the second order) perpendicular to the axis of rotation is provided besides the removing movement of the tool (of the 1st order in relation to its longitudinal movement) parallel to that axis, the tool is cleared much better especially during copying, where the profile to be machined is not parallel to the axis of rotation.

The point of the tool then follows a curve C whose tangent to the point O is parallel to the axis of rotation of the work-piece.

According to one particularity of the method according to the invention, the curve C is a small portion of a quarter circle. In conventional machine tools, the advance of the tool is limited by its clearance angle which is generally 6° to 8°. In machine tools whose tool is driven in a vibrating movement intended to break up the turnings, the superimposing of the advance and of the speed of the tool during its reciprocating movement must be compatible with the clearance angle.

That is why for a certain advance and taking into account the clearance angle of the tool and the metal worked, it will not be possible to reduce below a certain limit the time during which the movement of the tool is in phase I'.

On the other hand, for reasons related to the cooling of the tool, the time corresponding to the duration of the phase I cannot be taken as less than a certain value.

As it is not possible to vary the duration of the time i corresponding to the duration of the phases I and I', it is possible to improve the state of the surface by reducing the frequency of the vibrations, that is, by increasing the time j corresponding to the phase J; nevertheless, a certain limit beyond which the turning formed would exceed the total maximum permissible length must not be exceeded. The best results have been obtained with the method according to the invention when $j > 2\,i$.

The device enabling the implementing of the method according to the invention is a tool-carrier which may be installed on the trolley of a lathe, characterized in that it comprises two parallel guides fixed relative to the body of the tool-carrier, a mobile tool support installed between the two guides and rotating about an axis orthogonal to the guides and fixed at its ends on these latter, a stop fixed to the body of the tool-carrier, return means bringing back the tool support against the said stop, means for periodically moving the said support away from the said stop.

The tool-carrier is installed on the trolley so that the guides are parallel to the working plane containing the axis of rotation of the work-piece, when the tool support is moved away from the stop, the support rotates about the axis orthogonal to the two guides, remaining installed between these latter; the point of the tool therefore describes a portion of a circle centred on the said axis whose length depends on the distance by which the support has been moved away from the stop.

The tool support must be arranged substantially orthogonal to the axis of rotation of the work-piece, so that the point of the tool describes a portion of a circle going from a point of origin to a point of maximum travel, the tangent to the circle at the point of origin being parallel to the axis of rotation of the work-piece. When the support is against the stop, the point of the tool is at the point of origin and the tool is in the working position.

According to a particularly simple embodiment of the tool-carrier according to the invention, the means for moving the support away comprise: A drive shaft; An excentric driven in a rotating movement about an axis parallel to the guides by the drive shaft, the periphery of the said excentric coming into contact periodically with the support and tending to move the latter away from the stop.

With such a tool-carrier, for a determined curve C (portion of a quarter circle) for a certain advance of the tool and for a duration $i$ of the phases I and I', the rotation speed of the excentric is determined and the duration $j$ of the phase J is therefore also determined.

It is thus possible to obtain a duration $j$ which is in the order of twice $i$.

According to a variant of the tool-carrier according to the invention the means for moving away comprise: A drive shaft; An excentric driven in a rotating movement about an axis parallel to the guides by the drive shaft; A crown wheel surrounding the excentric and capable of rotating about the latter and comprising, on its external part, at least one protrusion which may come into contact with the said support; Means for coupling the drive shaft to the said crown wheel, making the said crown wheel rotate in the reverse direction to the excentric.

It is thus possible to obtain durations $j$ greater than 2 $i$. Indeed, if the speed of rotation of the excentric is always determined when the advance, the curve C and the duration $i$ are fixed, the frequency of the moving of the support away from its stop (hence the duration $j$) depends on the difference between the speed of rotation of the excentric and the speed of the crown wheel surrounding the excentric.

The duration $j$ may be divided by 2, by 3, etc., arranging 2, 3, etc. protrusions spaced out round the periphery of the crown wheel. The spacing out of these protrusions round that periphery is preferably irregular so as to reduce the vibrations.

According to one particularity of the invention, the coupling means make it possible to reduce the rotation speed between the crown wheel and the drive shaft.

According to a particular embodiment of that variant, the coupling means comprise a small toothed wheel which may rotate about the excentric driven in a rotating movement by the drive shaft, a large toothed wheel fixed to the body of the tool-carrier, along the inside periphery of which the small toothed wheel rotates, the said small toothed wheel being fast with the said crown wheel.

The tool-carrier according to the invention may, to great advantage, be installed on the trolley of lathes intended to effect turning operations, screw-cutting operations, copying, etc.

The following description with reference to the accompanying drawings will make it easier to understand how the invention may be implemented.

BRIEF DESCRIPTION OF THE DRAWINGS

FIG. 2 is a side view of the tool-carrier according to the invention.

FIG. 3 is a top view, after a partial cutaway, of an embodiment of the tool-carrier according to the invention.

In this various figures, only the element necessary for understanding the invention have been shown. Like elements are given like numerical designations.

In FIG. 1, the machining device illustrated, which shows the state of the art, comprises a lathe 1 driving a work-piece 2 in a rotating movement about the axis $x$-$y$.

That device also comprises a saddle 3 moving parallel to $x$-$y$ and a trolley 4 moving perpendicular to $x$-$y$. The tool 5 is installed on that trolley.

When copying with two axes is required to be effected, the trolley and the saddle drive the point 6 of the tool in a plane which will be called the working plane. That plane contains the axis $x$-$y$ and, in order to simplify the description subsequently, the working plane is considered to be horizontal.

In known devices, unidirectional vibration means are used for breaking up the turnings.

According to the state of the art, the vibrating direction $v$-$v'$ is chosen parallel to the axis $xy$; in that case, when the curved portions of the work-piece are developed, the tool will dig into the material and the surface state will have a very coarse quality.

DESCRIPTON OF PREFERRED EMBODIMENTS

Figure 1:
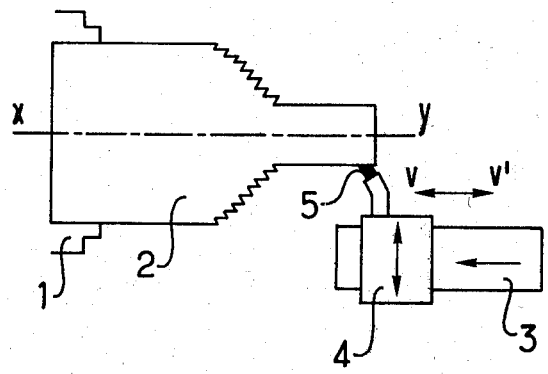
FIG. 1 is a schematic view of a machining device illustrating the state of the art.

FIG. 2 is a side view of the tool-carrier 10 according to the invention, intended to be installed in the place of the tool 5 on the trolley 4 of the machining device according to FIG. 1.

The tool-carrier 10 comprises two parallel guides 11, 12 which, it will be assumed here, are horizontal, fixed relative to the body 13 of the tool-carrier.

The tool-carrier also comprises a tool support 14 having a substantially parallelepipedical shape, arranged between the guides 11, 12 and rotating about an axis 15 orthogonal to the guides. The ends of screws 16, 17 defining axis 15 are screwed into the guides 11 and 12. The tool 18, whose point 19 may describe a portion of a circle C centered on the axis 15 is installed at the end of the tool support 14.

The clearance angle is shown in FIG. 2 by the angle formed by the cutting surface of the tool and a vertical line.

When the tool-carrier is installed on the trolley 4, the tool-carrier is directed so that the plane passing through the axis 15 and through the point 19 of the tool 18 be orthogonal to the axis of rotation $x$-$y$ of the work-piece.

In FIG. 3, which is a partly cutaway top view of an embodiment of a tool-carrier according to the invention, the tool support 14, which is mobile about the axis 15 may be distinguished.

The support 14 is pulled back against a stop 20 fixed to the body 13, by a return spring 21. Means 22 for moving the support 14 away comprises a motor 23 whose horizontal shaft 24 drives in a rotating movement an excentric 25, all being installed at the back of the body 13.

The excentric 25 comprises a ball bearing 26 having a horizontal axis, whose periphery comes into contact with the end 27 of the support 14. The drive shaft 24 rotates in a ball bearing 28 installed in the body 13 and the shaft 29 of the excentric 25 rotates in a ball bearing 30 having the same axis as the ball bearing 28.

Figure 4:
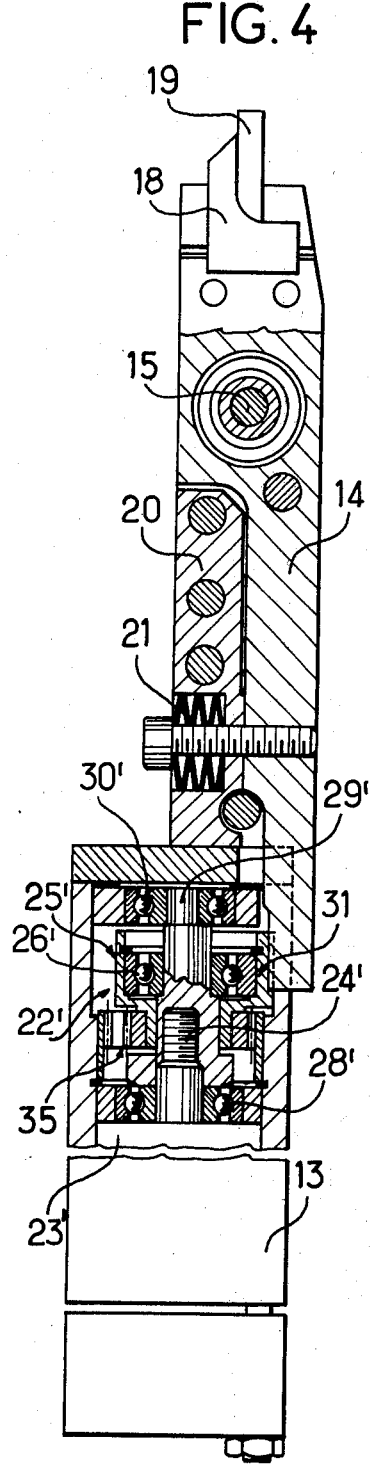
FIG. 4 is a top view, after a partial cutaway, of a variant of the tool-carrier according to the invention.
Figure 5:
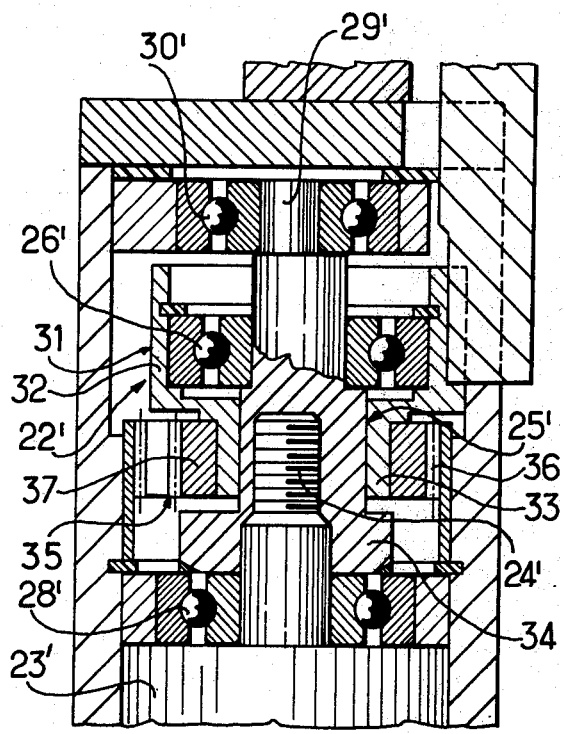
FIG. 5 is an enlarged sectional view of a portion of FIG. 4 having in greater detail the means for moving away the support.
Figure 6:
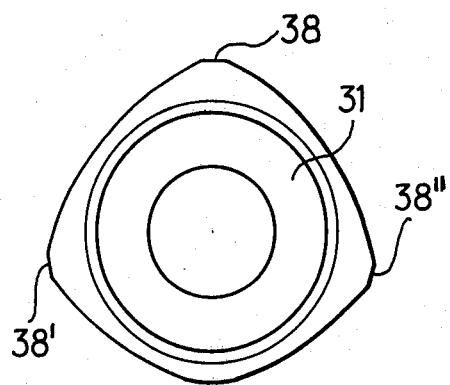
FIG. 6 is a side view of the crown wheel installed on the excentric of the tool-carrier in FIG. 4.

FIGS. 4 and 5 are partly cutaway top views of a variant of the tool-carrier according to the invention. According to that variant, only the means 22' for moving away differ from the embodiment according to FIG. 3. They comprise a motor 23' installed on the body 13 whose horizontal shaft 24' drives an excentric 25' in a rotating movement. The excentric 25' comprises a ball bearing 26' having a horizontal axis, whose periphery is provided with a crown wheel 31 shown in greater detail in FIG. 6.

The drive shaft rotates inside a ball bearing 28' fixed in the body 13 and the axle 29' of the excentric 25' rotates in a ball bearing 30' having the same axis as the bearing 28'.

The crown wheel 31 comprises a cylindrical portion 32 having a large radius fixed to the periphery of the bearing 26' and a cylindrical part having a smaller radius 33 which may rotate about the part 34 of the excentric 25' in direct contact with the drive shaft 24'.

The crown wheel 31 is driven in a rotating movement in the reverse direction to the excentric through coupling means 35 coupling the drive shaft 24' to the said crown wheel. These means 35 comprise a large toothed wheel 36 having the same axis as the drive shaft 24' inside which a small toothed wheel 37 fixed to the outside portion of the cylindrical part 33, having a small radius, of the crown wheel 31, rotates.

The crown wheel 31 is provided, at the periphery of its portion 32 having a large radius, with three protrusions 38, 38', 38" (see FIG. 6) the portion of periphery 38', 38" being slightly greater than the portions 38 38' and 38 38".

The said protrusions 38, 38', 38" come into contact with the end 27' of the support 14 and move it away from its position against the stop.

Assuming that the crown wheel is provided with only one protrusion and that it is fixed to the excentric, at each turn of the drive shaft, the support will be moved away once. But if the crown rotates about the excentric in the reverse direction to the direction of rotation of the excentric about its axis, the contact between the protrusion and the end 27' of the support will be made only once every $n$ turns, $n$ being greater than 1 and depending on the coefficient of gear reduction of coupling means 35. That coefficient of reduction depends on the relative number of teeth of the wheels 36 and 37. If that coefficient is ⅞, during one turn of the shaft, the protrusion will therefore have turned only ⅛ (1⅞) of a turn. That means that if will require 8 turns of the drive shaft to move the support away from the stop once.

If, instead of one protrusion, the crown wheel comprises three protrusions, during 8 turns of the drive shaft, the support will be moved away three times.

Figure 8:
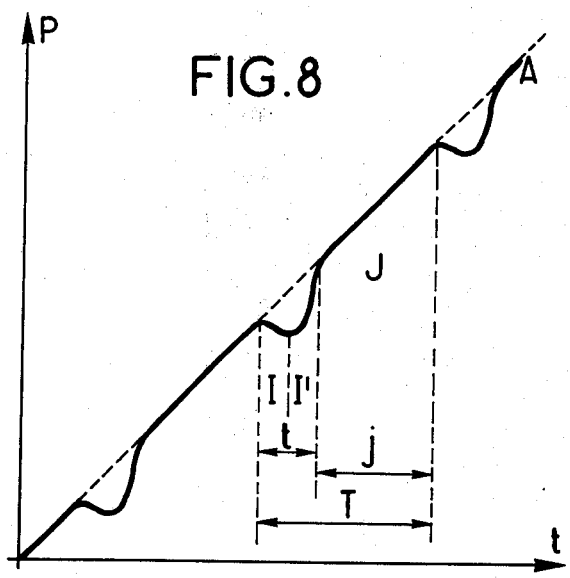
FIG. 8 is a plot of the movement of the point of the tool as a function of time.

FIG. 8 shows the movement of the point of the tool as a function of time.

Figure 7:
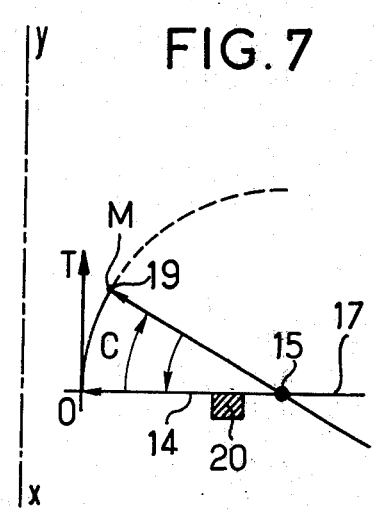
FIG. 7 shows the relative cyclic movement followed by the point of the tool.

When the advance of the tool is constant, the movement of the tool is shown by a straight line A passing through the point of origin. The point of the tool is driven, besides that drive movement, with a cyclic movement along a curve C which is a portion of a quarter circle (at the most a few degrees of an arc) limited by the points O and M, (see FIG. 7) the tangent T at the point O to the circle being parallel to the axis of rotation of the work-piece.

When the support is in contact with the stop (phase J of the cyclic movement) the point of the tool is at the point O and the curve C which is representative of the movement of the point of the tool merges with the straight line A. When the support is moved away from the stop, the point of the tool passes from the point O to the point M and the curve C passes below A (phase I).

The curve C contacts A again when the support comes back into contact with the stop (phase I'), the point of the tool passing from the point P to the point O of the curve C.

The duration $i$ of the phases I and I' is determined by the rotation speed of the drive shaft and by the length of the portion of circle OM. The latter is chosen sufficient for the tool to clear the work-piece.

The duration $j$ of the phase J is equal to the period T of the cyclic movement less the duration $i$.

In the embodiment in FIG. 3, the period T is determined by the rotation speed of the drive shaft, so that when that speed is fixed (for a determined portion OM of circle) $i$ and $j$ are determined.

On the other hand, in the embodiment in FIG. 4, the period T depends not only on the rotation speed of the drive shaft but also on the coefficient of reduction of the coupling means between the drive shaft and the crown wheel provided with protrusions, so that it is always possible once $i$ is fixed, to choose $j$ for example so that the turnings have the required length.

The tool-carrier according to the invention may be applied just as well to lathes machining large workpieces as to screw-cutting machines, whether the workpiece be longitudinally mobile along its axis of rotation or whether the trolley be installed on a saddle which may move parallel to the axis of rotation of the workpiece.

The working plane passing through the axis of rotation of the work-piece is not necessarily horizontal; it may be vertical or even inclined, more particularly in screw-cutting machines.

Although the tool-carrier which has just been described may appear to afford the greatest advantages for the implementing of the invention, it will be understood that various modifications may be made thereto without going beyond the scope of the invention, it being possible to replace certain of its elements by other elements capable of fulfilling the same technical functon or an equivalent technical function therein.

I claim:

1. In a method for machining with a lathe and more particularly for copying, including the steps of driving the workpiece to be machined in rotation about an axis and driving the point of the tool, in relation to the axis, in two movements in a working plane passing through the said axis, the first movement being in two directions one of which is parallel to the said axis, and the second movement being a relative cyclic movement having a period of T and a slight amplitude in relation to the dimensions of the work-piece, the improvement wherein said cyclic movement comprises the following three phases:
- a first phase I during which the point of the tool moves away from the work-piece starting from a point of origin O and reaching a maximum travel point M following a plane curve C whose tangent at the point of origin O is substantially parallel to the said axis,
- a second phase I' during which the point of the tool comes back from the point of maximum travel towards the point of origin O following the curve C, and
- a third phase J during which the point of the tool remains at the point of origin O.

2. The method for machining with a lathe according to claim 1, wherein the curve C is a portion of a quarter circle.

3. The method for machining with a lathe according to claim 1 wherein the duration $j$ of the phase J is at least equal to twice the duration $i$ during which the phases I and I' take place.

4. A tool carrier which may be installed on the trolley of a lathe, comprising:
- two parallel guides (11, 12) fixed relative to the body (13) of the tool-carrier (10),
- a mobile tool support (14) installed between the two guides (11, 12) for rotation about an axis (15) orthogonal to the guides (11, 12) and fastened at its ends to these guides,
- a stop (20) fixed to the body (13) of the tool-carrier (10),
- a return means (21) for driving the tool support (14) back against the said stop (20), and
- means (22) for periodically moving the said support (14) away from the said stop (20).

5. The tool-carrier according to claim 4, wherein: the means (22) for moving the support away comprises:
- a drive shaft (24);
- an excentric (25) driven in a rotating movement about an axis parallel to the guides (11, 12) by the drive shaft (24) with the periphery of the said excentric (25) coming periodically into contact with the support (14) for moving the latter away from the stop (20).

6. The tool-carrier according to claim 4, wherein: the means (22) for moving away comprises:
- a drive shaft (24');
- an excentric (25') driven in a rotating movement about an axis parallel to the guides (11, 12) by the drive shaft (24');
- a crown wheel (31) surrounding the excentric (25') and rotatable about the excentric and having, on its external periphery, at least one protrusion (38) for contacting said support (14); and
- means (35) for coupling the drive shaft (24') to the said crown wheel, (31) to make the crown wheel (31) rotate in the reverse direction to the excentric (25').

7. The tool-carrier according to claim 6, wherein the coupling means (35) includes means for reducing the rotation speed between the crown wheel (31) and the drive shaft (24').

8. The tool-carrier according to claim 7, wherein: the coupling means (35) comprises a small mobile toothed wheel (37) mounted for rotation about the excentric (25') on crown wheel (31) and driven by the drive shaft (24'), and a large toothed wheel (36) fixed to the body (13) of the tool carrier, with the small toothed wheel (37) rotating on the inside periphery of the large toothed wheel.

9. The tool carrier according to claim 6 wherein in the crown wheel (31) comprises several protrusions (38, 38'; 38'') spaced out irregularly along its periphery.

10. The tool carrier according to claim 5 wherein the drive shaft (24, 24') is driven in a rotating movement by a motor (23, 23') installed in the body (13) of the tool-carrier.

* * * * *